United States Patent
Pellet

(10) Patent No.: US 7,456,791 B2
(45) Date of Patent: Nov. 25, 2008

(54) METHOD OF EMITTING AN ELECTROMAGNETIC SIGNAL, AND ASSOCIATED ANTENNA

(75) Inventor: Michel Pellet, Paris (FR)

(73) Assignee: Etat Francais represente par le Delegue General pour l'Armement, Arcueil (FR)

(*) Notice: Subject to any disclaimer, the term of this patent is extended or adjusted under 35 U.S.C. 154(b) by 0 days.

(21) Appl. No.: 10/964,665

(22) Filed: Oct. 15, 2004

(65) Prior Publication Data

US 2005/0122272 A1 Jun. 9, 2005

(30) Foreign Application Priority Data

Oct. 17, 2003 (FR) .................................. 03 12146

(51) Int. Cl.
*H01Q 1/26* (2006.01)
(52) U.S. Cl. ....................................................... 343/701
(58) Field of Classification Search ................ 343/721, 343/701, 793; 333/99
See application file for complete search history.

(56) References Cited

U.S. PATENT DOCUMENTS

| | | | | |
|---|---|---|---|---|
| 5,594,456 A | * | 1/1997 | Norris et al. | 343/701 |
| 6,046,705 A | * | 4/2000 | Anderson | 343/701 |
| 6,369,763 B1 | * | 4/2002 | Norris et al. | 343/701 |
| 6,605,808 B2 | * | 8/2003 | Mickan et al. | 250/341.8 |
| 6,606,063 B1 | * | 8/2003 | Merenda | 343/701 |
| 6,650,297 B2 | * | 11/2003 | Anderson et al. | 343/701 |
| 6,657,594 B2 | * | 12/2003 | Anderson | 343/701 |
| 6,674,970 B1 | * | 1/2004 | Anderson | 398/121 |
| 6,842,146 B2 | * | 1/2005 | Alexeff et al. | 343/701 |
| 7,063,285 B1 | * | 6/2006 | Turley et al. | 242/171 |
| 2007/0040726 A1 | * | 2/2007 | Kremeyer | 342/52 |

* cited by examiner

*Primary Examiner*—Huedung Mancuso
(74) *Attorney, Agent, or Firm*—Oliff & Berridge, PLC

(57) ABSTRACT

The invention relates to the field of antennas and relates in particular to an generator of a laser radiation and means for coupling an electrical signal to this laser radiation, said antenna being characterized in that the generator of a laser radiation is a femtosecond laser.

16 Claims, 2 Drawing Sheets

METHOD OF EMITTING AN ELECTROMAGNETIC SIGNAL, AND ASSOCIATED ANTENNA

This Application claims priority from FR 03 012146, filed Oct. 17, 2003 the disclosure of which is incorporated herein by reference thereto.

BACKGROUND OF THE INVENTION

The invention relates to the field of antennas, especially that of plasma antennas able to operate over a very wide frequency band.

Known antennas operate in a narrow frequency band and their size is inversely proportional to the operating wavelength.

In the low frequency (LF), very low frequency (VLF), and extremely low (ELF) ranges, the height of quarter-wave antennas must reach several hundred meters to several hundred kilometers, for example 750 km at 100 Hz, and their design becomes problematic. Moreover, it is far from easy to move them.

This frequency range is useful however, particularly when communicating with a submerged vessel such as a submarine.

To solve this problem, the use of plasma antennas is known.

Thus, U.S. Pat. No. 3,404,403 describes a plasma antenna having means for producing a laser beam, means for enabling this laser to be used in pulsed mode, means for focusing this laser beam on different spots to ionize an air column, and means for coupling a signal to the base of the air column.

U.S. Pat. No. 6,087,993 is also known; this describes an antenna having a vertical ionizing beam generator, and means for supplying the generator enabling a plasma column to be produced, the generator being able to produce a modulated current in the plasma. In addition, an electro-optical crystal is associated both with the laser beam and with a generator of a frequency-modulated signal. Thus, the crystal modulates the phase or amplitude of the laser, and this modulation directly affects the plasma column.

SUMMARY OF THE INVENTION

However, plasmas created in the framework of these patents have two major drawbacks: first, they are dispersive so require very large power inputs, and second, there is a non-linearity phenomenon in the air due to the large amount of power involved, and this non-linearity causes the emitted signal to become garbled.

The goal of the invention is to provide an antenna that is easy to build and easy to move, does not require a very large power input, and does not produce any non-linearity phenomena.

The solution is an antenna having a laser radiation generator and means for coupling an electrical signal to this laser radiation, said antenna being characterized in that the generator (1) of a laser radiation (2) is a femtosecond laser.

According to one particular feature, the generator has means for pulsing the laser radiation.

According to one feature enabling the filament length to be controlled, the generator has means for modifying the shape of the laser pulses and/or means for varying the power of the laser radiation.

According to another feature, the coupling means comprise a coupling ring, preferably a metal ring, disposed at the generator output.

According to another feature, the coupling means comprise an acousto-optical modulator.

The invention also relates to a method for emitting an electromagnetic signal, characterized by including a step consisting of generating a filamentation in the air or in another gas with a femtosecond laser, then maintaining this filamentation by generating laser pulses with said femtosecond laser and coupling the electrical signal to the radiation emitted by the femtosecond laser.

According to one particular feature, a method according to the invention includes a step in which the filamentation length is controlled.

According to one additional feature, the filamentation length is controlled by regulating the emitted laser power.

According to another feature, the set value for controlling the filamentation length corresponds to one-half or one-quarter the wavelength of the carrier frequency of the electromagnetic signal.

BRIEF DESCRIPTION OF THE DRAWINGS

Other advantages and features of the present invention will emerge from the description of a number of embodiments of the invention, with reference to the attached drawings.

DETAILED DESCRIPTION OF THE PREFERRED EMBODIMENT

Figure 1:
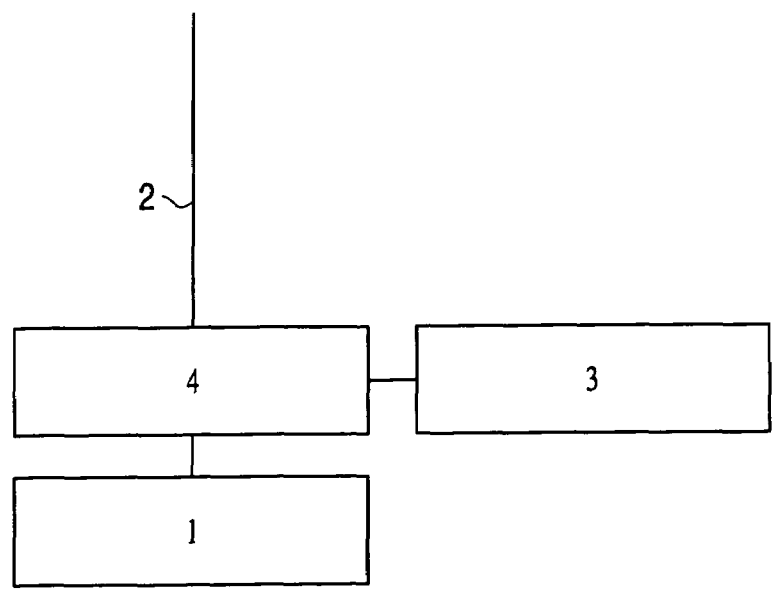
FIG. 1 is a general diagram of the invention.

FIG. 1 shows schematically an antenna according to the invention.

This antenna has a generator 1 of a laser radiation 2, means 3 for generating an electrical signal, means 4 for coupling this electrical signal to said laser radiation 2, and this generator 1 of a laser radiation 2 is a femtosecond laser.

Figure 2:
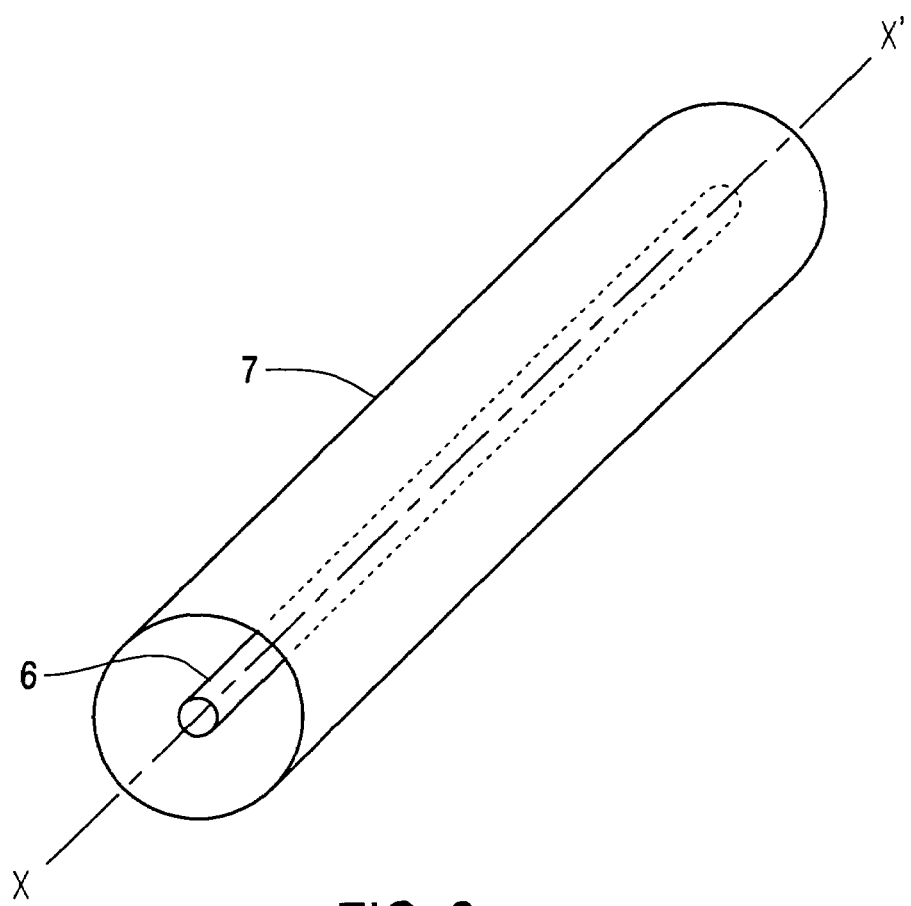
FIG. 2 is a diagram of one practical variant of the invention.

In this embodiment, this femtosecond laser operates in pulsed mode and in the air, and, as shown in FIG. 2, creates not a plasma column as in the prior art, but a filamentation, i.e. a column 7 in which the refraction index increases from the outside to the inside thus generating ionization 6 only at the axis of symmetry of the column, hence filamentous ionization 6 rather than ionization of the entire column 7, which. considerably reduces the power required to maintain the ionization and eliminate non-linearity problems.

Figure 3:
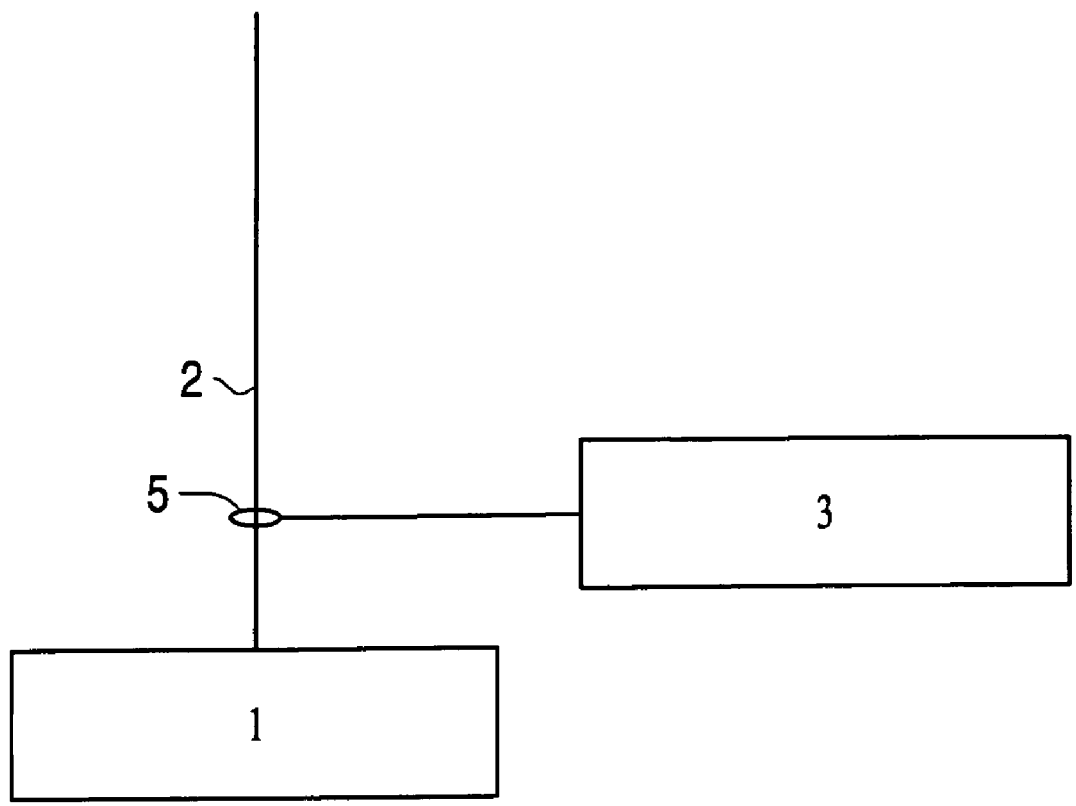
FIG. 3 shows more precisely the coupling means 4 shown in FIG. 1.

FIG. 3 shows more precisely the coupling means 4 according to a particular embodiment.

The means for coupling the electrical signal to the laser are comprised of a metal ring 5, namely a copper ring or a ring of any other conducting material, disposed exactly at the output of the femtosecond laser 1 such that the laser radiation passes through the center of the circle formed by the ring 5. Thus, the means 3 for generating an electrical signal furnish a signal to be emitted within a signal generated at the carrier frequency.

This electrical signal is generated by known means and this electrical signal is emitted to the coupling ring 5 which acts as an electrode on the laser filamentation by injecting the modulated signal into this filament, which signal is thus emitted electromagnetically.

For the operation of the antenna, either the signal applied to the coupling ring must have a maximum frequency compatible with the sampling frequency of the ionized filament, or the system uses relaxation of the filament to be able to emit.

Hence, an antenna according to the invention is mobile and emission is made discretely with an efficiency of approximately one. Moreover, no fixed infrastructure is necessary for emission. No aircraft, balloons, or other devices are necessary to erect the emitting antenna. The antenna is comprised of an ionized filamentation created by an upwardly directed femtosecond laser. The repetition rate of this laser agrees with the minimum Shannon sampling rate corresponding to the frequency VLF/LF $\lambda$ to be emitted. The power of the laser is adjusted so that the plasma wavelength is always equal to the tuning wavelength of the system, namely $\lambda$, $\lambda/4$, or $\lambda/2$, depending on the desired modes. For $\lambda/2$ tuning, the impedance seen at the antenna base would be ohmic and would equal 73$\Omega$ for $\lambda/4$ tuning.

The non-material part of the antenna avoids most of the faults and difficulties linked to the enormous size of emitting antennas, essential for radiating energy in this frequency range. It can be instantaneously tuned by adjusting the wavelength, thus doing away with tuning devices that must be inserted between the emitters proper and the emitting antennas. Thus, tuning follows modulation, thus permitting modulations that were heretofore totally impossible. Information flow and information security are greatly increased relative to the prior art and weather resistance is out of all proportion to that known to date. Mobile emitters can be produced and projected for example from a land platform, a marine platform, or an air platform. Hence it is possible to deploy stations as needed in the case of remote submarine deployment, or to have a station near the national senior military authority which can thus issue its orders to the weapons platforms without passing through infrastructure networks.

The possibility of using half-wave dipoles rather than quarter-wave dipoles provides freedom from ground plane constraints where the coupling of the electrical source to the laser filament must be located at the center of the filament length.

Of course, numerous modifications may be made to the embodiments described above without departing from the framework of the invention. Thus, although the exemplary embodiment relates in particular to low frequencies, the invention can be applied to all frequency ranges provided they use a whip antenna for electromagnetic emission.

Furthermore, this antenna can also be used for receiving an electromagnetic signal.

Moreover, the operation of an antenna according to the invention is not confined to a vertical filament, and this filament can be generated in any direction.

The invention claimed is:

1. Antenna for emitting an electrical signal to the LF, VLF or ELF range comprising:
    a laser radiation generator; and
    means for coupling an electrical signal to this laser radiation,
    wherein, the generator of a laser radiation is a femtosecond laser, which is used to generate a filamentation, and
    the coupled electrical signal and the laser radiation being emitted to the LF, VLF or ELF range.

2. Antenna according to claim 1, characterized in that the generator has means for pulsing the laser radiation.

3. Antenna according to claim 2, characterized in that the generator has means for modifying the shape of the laser pulses and/or means for varying the power of the laser radiation.

4. Antenna according to claim 1, characterized in that the coupling means comprise a coupling ring, disposed at the generator output.

5. Antenna according to claim 2, characterized in that the coupling means comprise a coupling ring, disposed at the generator output.

6. Antenna according to claim 3, characterized in that the coupling means comprise a coupling ring, disposed at the generator output.

7. Antenna according to claim 1, characterized in that the coupling means comprise an acousto-optical modulator.

8. Antenna according to claim 2, characterized in that the coupling means comprise an acousto-optical modulator.

9. Antenna according to claim 3, characterized in that the coupling means comprise an acousto-optical modulator.

10. Method for emitting an electromagnetic signal to the LF, VLF or ELF range, comprising:
    generating a filamentation in the air or in another gas with a femtosecond laser;
    maintaining the filamentation by generating laser pulses with said femtosecond laser;
    coupling an electrical signal to the radiation emitted by the femtosecond laser; and
    emitting the coupled electrical signal and the laser radiation to the LF, VLF or ELF range.

11. Method according to claim 10, further comprising controlling the filamentation length.

12. Method according to claim 11, wherein the filamentation length is controlled by regulating the emitted laser power.

13. Method according to claim 10, wherein a set value for controlling the filamentation length corresponds to one-half or one-quarter the carrier frequency of the electromagnetic signal.

14. Method according to claim 11, wherein a set value for controlling the filamentation length corresponds to one-half or one-quarter the carrier frequency of the electromagnetic signal.

15. Method according to claim 12, wherein a set value for controlling the filamentation length corresponds to one-half or one-quarter the carrier frequency of the electromagnetic signal.

16. Antenna for emitting an electrical signal to the LF, VLF or ELF range comprising:
    a laser radiation generator; and
    means for coupling an electrical signal to this laser radiation,
    wherein, the generator of a laser radiation is a femtosecond laser, which is used to generate a filamentation, and
    the coupled electrical signal being emitted to the LF, VLF or ELF range by the antenna.

* * * * *